(12) United States Patent
Matsuyuki et al.

(10) Patent No.: US 11,276,309 B2
(45) Date of Patent: Mar. 15, 2022

(54) VEHICLE CONTROL DEVICE

(71) Applicant: Hitachi Automotive Systems, Ltd., Hitachinaka (JP)

(72) Inventors: Katsuya Matsuyuki, Hitachinaka (JP); Satoru Okubo, Hitachinaka (JP); Munetoshi Tsuge, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 15/734,451

(22) PCT Filed: Apr. 23, 2019

(86) PCT No.: PCT/JP2019/017124
§ 371 (c)(1),
(2) Date: Dec. 2, 2020

(87) PCT Pub. No.: WO2019/239725
PCT Pub. Date: Dec. 19, 2019

(65) Prior Publication Data
US 2021/0118300 A1    Apr. 22, 2021

(30) Foreign Application Priority Data

Jun. 14, 2018    (JP) .............................. JP2018-113546

(51) Int. Cl.
*G08G 1/16*        (2006.01)
*B60R 1/00*        (2022.01)
(Continued)

(52) U.S. Cl.
CPC ................. *G08G 1/16* (2013.01); *B60R 1/00* (2013.01); *G06K 9/00805* (2013.01);
(Continued)

(58) Field of Classification Search
CPC . B60R 1/00; B60R 2300/10; B60R 2300/105; B60R 2300/303;
(Continued)

(56) References Cited

U.S. PATENT DOCUMENTS 6,476,731 B1 * 11/2002 Miki .................... B60Q 1/0023
340/435
2011/0025848 A1 * 2/2011 Yumiba ................ B62D 15/029
348/148

(Continued)

FOREIGN PATENT DOCUMENTS

JP        2007-235529 A    9/2007
JP        2010-68069 A     3/2010
(Continued)

OTHER PUBLICATIONS

Google_search.pdf.*
(Continued)

*Primary Examiner* — Van T Trieu
(74) *Attorney, Agent, or Firm* — Foley & Lardner LLP

(57) ABSTRACT

A vehicle control device includes a plurality of imaging units that images an outside world of a vehicle, a surrounding screen image composition unit that combines a plurality of captured images captured by the plurality of imaging units to generate a surrounding screen image, a collision determination unit that determines whether an obstacle is present on a traveling route of the vehicle, an alarm screen image generation unit that selects, from a plurality of captured images, a captured image in which the obstacle is imaged to generate an alarm screen image including the selected captured image, and a display screen image switching unit that performs a process of displaying the surrounding screen image when the collision determination unit determines that the obstacle is not present, and displaying
(Continued)

the alarm screen image when the collision determination unit determines that the obstacle is present.

9 Claims, 12 Drawing Sheets

(51) Int. Cl.
*G06K 9/00* (2022.01)
*H04N 7/18* (2006.01)

(52) U.S. Cl.
CPC ......... *G06K 9/00825* (2013.01); *H04N 7/181* (2013.01); *B60R 2300/105* (2013.01); *B60R 2300/20* (2013.01); *B60R 2300/8093* (2013.01)

(58) Field of Classification Search
CPC .......... B60R 2300/20; B60R 2300/207; B60R 2300/301; B60R 2300/304; B60R 2300/305; G06K 9/00; G06K 9/00664; G06K 9/00791; G06K 9/00805; G06K 9/00825; G08G 1/16; G08G 1/164; G08G 1/165; G08G 1/166; H04N 7/18
See application file for complete search history.

(56) References Cited

U.S. PATENT DOCUMENTS

| | | | |
|---|---|---|---|
| 2013/0010118 A1 | 1/2013 | Miyoshi et al. | |
| 2015/0061895 A1* | 3/2015 | Ricci | G06Q 10/20 340/902 |
| 2015/0109444 A1* | 4/2015 | Zhang | H04N 7/188 348/148 |
| 2017/0054946 A1* | 2/2017 | Lee | H04N 7/18 |

FOREIGN PATENT DOCUMENTS

| | | |
|---|---|---|
| JP | 2011-205513 A | 10/2011 |
| JP | 2013-131177 A | 7/2013 |
| JP | 2013-132976 A | 7/2013 |
| JP | 2013-134597 A | 7/2013 |

OTHER PUBLICATIONS

International Search Report with English translation and Written Opinion issued in corresponding application No. PCT/JP2019/017124 dated Aug. 13, 2019.

* cited by examiner

*FIG. 12*

| A1 | A2 | A3 |
|----|----|----|
| A4 |    | A5 |
| A6 | A7 | A8 |

VEHICLE CONTROL DEVICE

TECHNICAL FIELD

The present invention relates to a vehicle control device that displays an image captured by a plurality of cameras mounted on the own vehicle.

BACKGROUND ART

In the related art, a vehicle surrounding monitoring system has been proposed in which the entire region in the front, rear, left, and right directions of the vehicle is imaged by, for example, four cameras, and a plurality of obtained original images is combined to process the combined images into one bird's-eye view screen image to enable recognition of the situation around the vehicle. Such a vehicle surrounding monitoring system is used for a vehicle control device that automatically controls a vehicle, such as automatic driving and automatic parking, to recognize the situation around the vehicle. For example, PTL 1 shows the technology of the monitoring system that switches an image to the original image by the camera with which an overlapping region is imaged when it is detected that an obstacle is present in the overlapping region in the bird's-eye view display image.

CITATION LIST

Patent Literature

PTL 1: JP 2007-235529

SUMMARY OF INVENTION

Technical Problem

In the vehicle surrounding monitoring system, the edges of screen images captured by adjacent cameras usually overlap when creating a bird's-eye view screen image, and the bird's-eye view screen image with continuity is displayed on the display device by converting the images of the overlapping regions. Therefore, when an object is present in the overlapping region, the object is not clearly displayed in the bird's-eye view screen image, and although the existence of the object can be recognized, the details of it cannot be confirmed. Therefore, for example, when an object is present in a region through which the vehicle passes, it is necessary for the vehicle control device or the driver to take evasive action.

However, when the overlapping region by adjacent cameras and the planned passage region of the vehicle under the automatic control overlap, there is a problem that the driver cannot confirm the presence or absence of an object in detail through the screen image, and has a difficulty in instantly determining an appropriate response.

The present invention has been made in view of the above point, and an object of the present invention is to provide a vehicle control device that allows an occupant to easily confirm the presence or absence of an obstacle through a screen image.

Solution to Problem

A vehicle control device of the present invention that solves the above problems includes a plurality of imaging units that images an outside world of a vehicle, a surrounding screen image composition unit that combines a plurality of captured images captured by the plurality of imaging units to generate a surrounding screen image, a collision determination unit that determines whether an obstacle is present on a traveling route of the vehicle, an alarm screen image generation unit that selects, from a plurality of captured images captured by the plurality of imaging units, a captured image in which the obstacle is imaged to generate an alarm screen image including the selected captured image, and a display screen image switching unit that performs a process of displaying the surrounding screen image when the collision determination unit determines that the obstacle is not present, and displaying the alarm screen image when the collision determination unit determines that the obstacle is present.

Advantageous Effects of Invention

According to the present invention, the occupant can easily confirm the presence or absence of an obstacle for the own vehicle through a screen image.

Further features related to the present invention will become apparent from the description herein and the accompanying drawings. In addition, problems, configurations, and effects other than those described above will be clarified by the following description of the embodiments.

BRIEF DESCRIPTION OF DRAWINGS

FIG. 12 is a diagram which shows a state in which the region adjacent to a vehicle as the center is divided into a grid pattern based on the region which is imaged by cameras attached to the vehicle.

DESCRIPTION OF EMBODIMENTS

Hereinafter, an embodiment of the vehicle control device of the present invention will be described with reference to the drawings.

Figure 1:
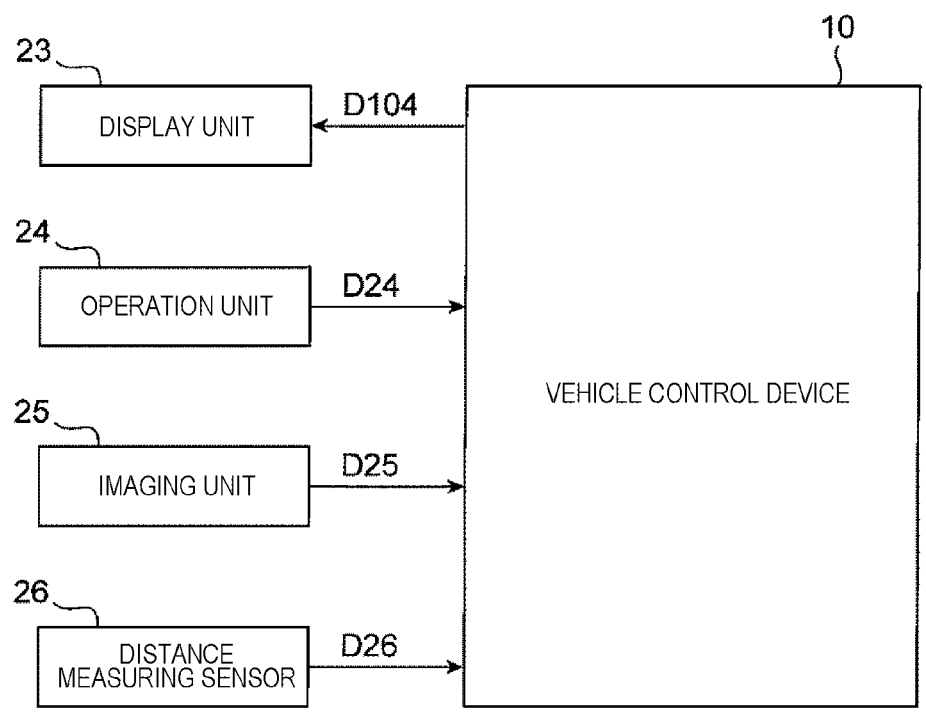
FIG. 1 is an overall configuration diagram of a vehicle control device of an embodiment of the invention.
Figure 2:
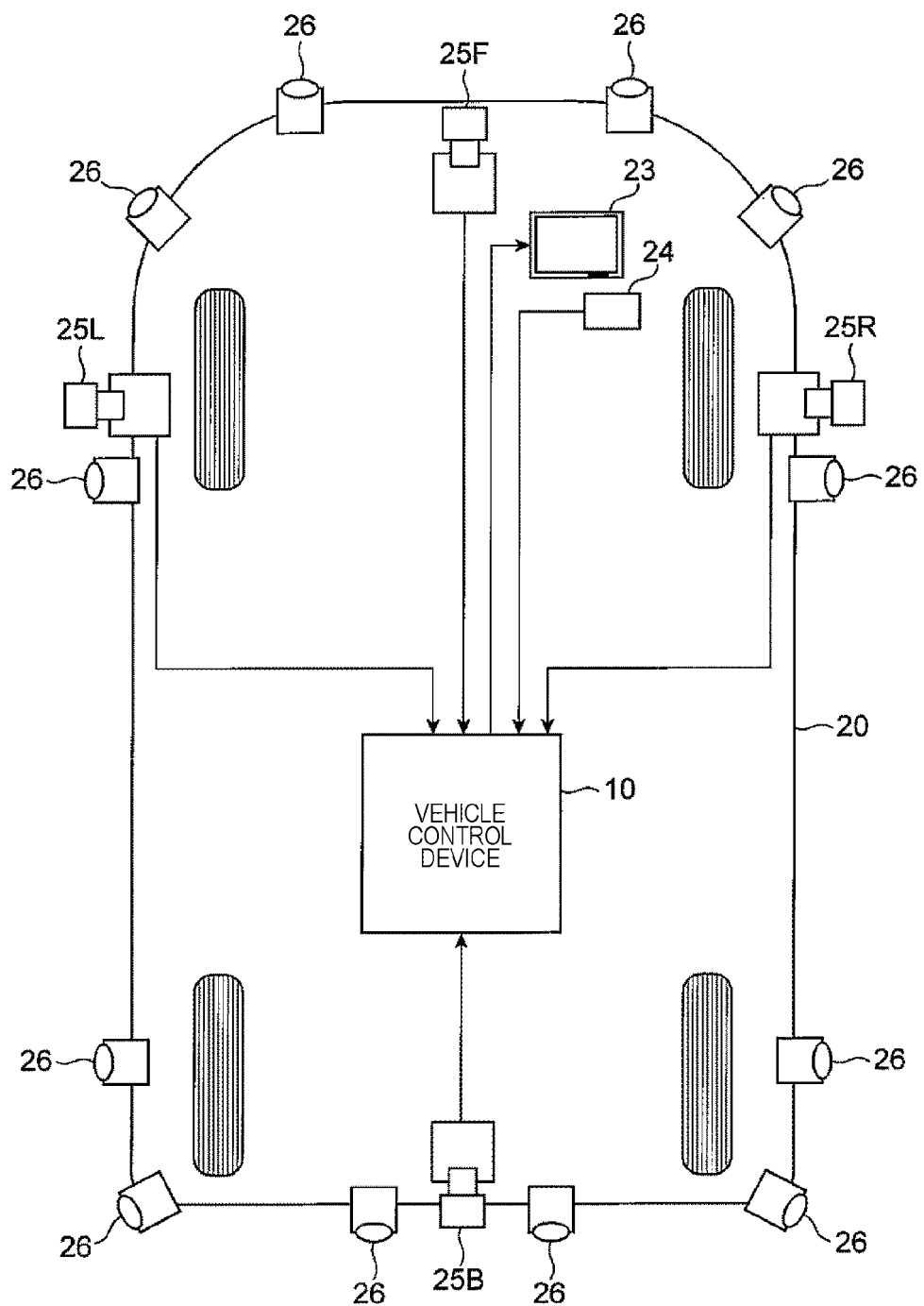
FIG. 2 is a schematic configuration diagram of a vehicle equipped with a vehicle control device.

FIG. 1 is an overall configuration diagram of a vehicle control device according to an embodiment of the present invention, and FIG. 2 is a schematic configuration diagram of a vehicle equipped with the vehicle control device.

A vehicle control device 10 controls the automatic driving of a vehicle 20, and, for example, performs control so that the vehicle 20 is automatically parked at the target parking position. At this time, in order to make the occupant of the vehicle aware of the situation around the vehicle, it has a function to display, on a display unit 23, a composite image such as a bird's-eye view screen image or a 3D screen image created by using images acquired from a plurality of cameras 25F, 25B, 25L, and 25R attached to the vehicle 20.

As shown in FIG. 1, the vehicle control device 10 has inputs which are connected to an operation unit 24, an imaging unit 25, and a distance measuring sensor 26, and receives data D24, D25, and D26. Further, it has an output which is connected to the display unit 23, and outputs data D104 to the display unit 23.

The display unit 23 and the operation unit 24 are installed in an operable position inside the vehicle so that they can be visually recognized and operated by the driver, and the imaging unit 25 and the distance measuring sensor 26 are attached to the outside of the vehicle so as to detect the environment around the vehicle.

The plurality of imaging units 25 is attached to the outside of the vehicle 20 in order to image the outside world of the vehicle 20. As shown in FIG. 2, the imaging unit 25 is composed of, for example, a camera 25F that images the front side of vehicle 20, a camera 25L that images the left side of vehicle 20, a camera 25B that images the rear side of vehicle 20, and a camera 25R that images the right side of the vehicle 20. In the example shown in FIG. 2, the configuration is such that the cameras are installed one by one on each of the front, rear, left, and right of the vehicle. Instead of one camera for each place, a stereo camera that captures images in the same direction with two cameras may be used. Further, the imaging unit 25 is not limited to the camera. It can also be composed of lidars (LIDAR: Light Detecting and Ranging) etc., and these mounting positions are not limited to the positions shown in FIG. 2. The data D25 imaged by the imaging unit 25 is input to the vehicle control device 10.

The distance measuring sensor 26 can be configured by a sonar, a laser radar, or a millimeter wave radar. The distance measuring sensor 26 measures the distance to an object located around the vehicle 20. The plurality of distance measuring sensors 26 is disposed on the front, rear, left, and right of the vehicle 20. The distance measurement data D26 by the distance measuring sensor 26 is input to the vehicle control device 10. The distance measuring sensor 26 is provided to detect an obstacle located around the vehicle 20. The obstacle located around the vehicle 20 includes an obstacle approaching the vehicle 20 from the front, the side, or the rear of the vehicle 20. For example, a preceding vehicle traveling in front of the vehicle 20 and a vehicle crossing the rear of the vehicle 20 are one of the obstacles. The vehicle control device 10 may detect an obstacle based on both the distance measurement data D26 and the imaging data D25, or may detect an obstacle based only on the imaging data D25.

Next, the specific operation of the vehicle control device 10 will be described with reference to FIG. 3.

Figure 3:
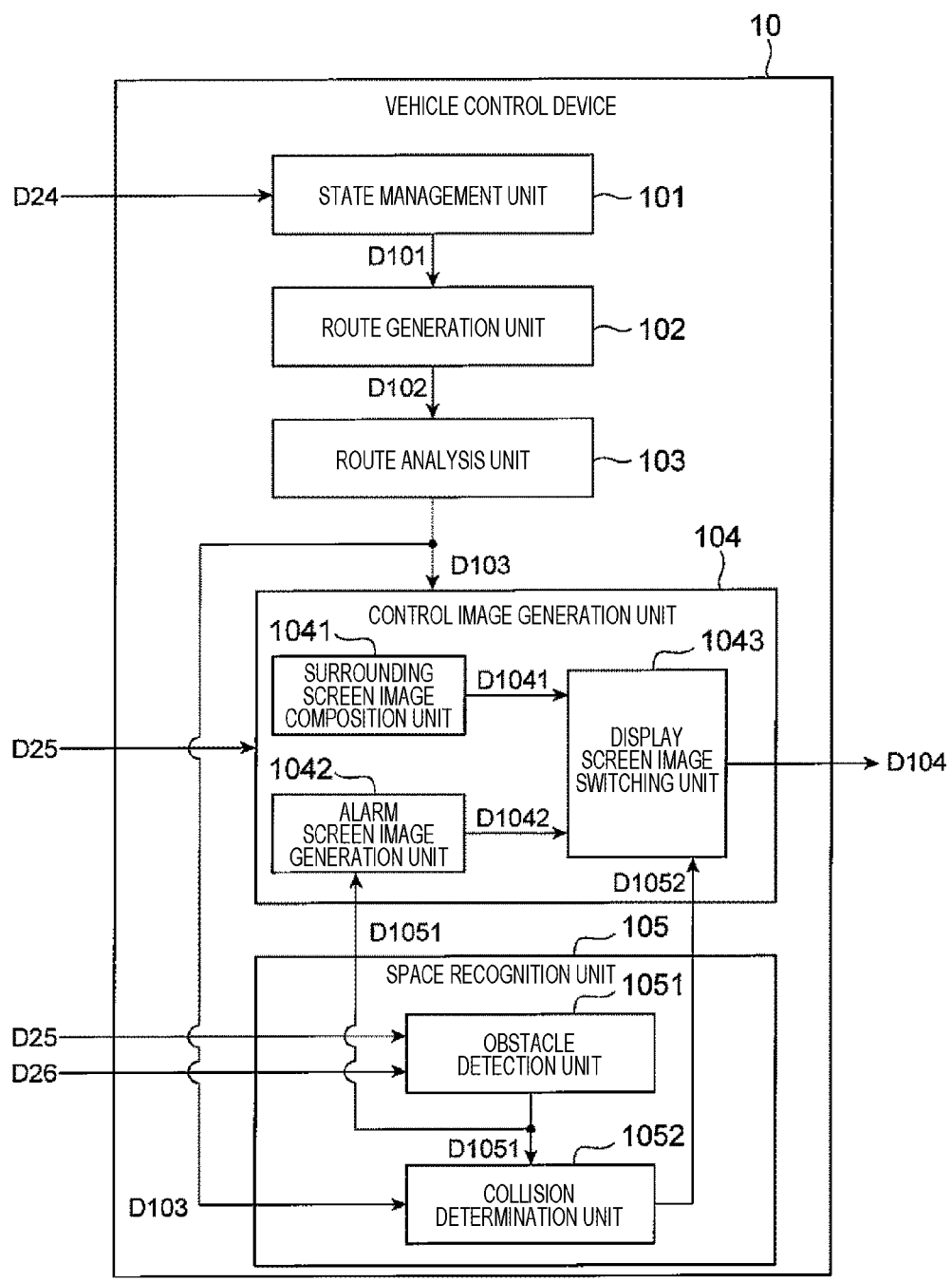
FIG. 3 is a block diagram which shows the functional structure of a vehicle control device.

FIG. 3 is a block diagram showing the functional configuration of the vehicle control device 10, and shows a specific internal structure of the vehicle control device 10. The vehicle control device 10 may be configured by a microcomputer. The operation of the vehicle control device 10 described below can also be implemented by a computer program.

The vehicle control device 10 includes a state management unit 101, a route generation unit 102, a route analysis unit 103, a control image generation unit 104, and a space recognition unit 105.

The state management unit 101 determines whether a route generation is necessary based on the setting data D24 input from the operation unit 24. For example, when the operation unit 24 is operated by the driver, and the destination is set, the setting data D24 including the destination information is input to the state management unit 101, and it determines that the route generation is necessary. When the state management unit 101 determines that the route generation is necessary, the state management unit 101 inputs route generation request data D101 including the destination information to the route generation unit 102.

The route generation unit 102 generates, based on the route generation request data D101 input from the state management unit 101, traveling route data D102 from the current position to the destination of vehicle 20 to retain memory. In the case of the automatic parking control, the current position is near the target parking position and the destination is the target parking position.

The route analysis unit 103 formulates travel plan data D103 based on the traveling route data D102. The route analysis unit 103 sets, as the travel plan data D103, travel target points on which the vehicle 20 travels at predetermined intervals on the traveling route. Then, the route analysis unit 103 sets the target acceleration/deceleration amount and the target steering amount at each travel target point based on the traveling route data D102 input from the route generation unit 102. The travel plan data D103 includes data on the travel target points and data on the target acceleration/deceleration amount and the target steering amount at each travel target point. The route analysis unit 103 supplies the formulated travel plan data D103 to the control image generation unit 104 and a collision determination unit 1052 of the space recognition unit 105.

The control image generation unit 104 includes a surrounding screen image composition unit 1041, an alarm screen image generation unit 1042, and a display screen image switching unit 1043. The surrounding screen image composition unit 1041 combines a plurality of captured images captured by the cameras 25F, 25B, 25L, and 25R of the imaging unit 25 to generate a surrounding image. The surrounding screen image composition unit 1041 receives the imaging data D25 from the imaging unit 25. For example, it generates a composite image such as a bird's-eye view image obtained by viewpoint converting the data to a screen image looking down from a virtual viewpoint, above the vehicle, from which the surroundings of the vehicle can be displayed, and a 3D image obtained by viewpoint converting the data to a screen image looking down the front from a virtual viewpoint diagonally behind and above the vehicle 20. The surrounding screen image is a screen image in which only the composite image is displayed, or the displays of a region through which the vehicle 20 passes and a message are superimposed on the composite image. The surrounding screen image composition unit 1041 outputs the surrounding screen image data including the composite image as vehicle surrounding screen image data D1041 to the display screen image switching unit 1043.

The alarm screen image generation unit 1042 selects, based on the obstacle data D1051 provided by an obstacle detection unit 1051 described later, a captured image in which the obstacle is imaged from a plurality of captured images captured by the plurality of imaging units 25 to generate an alarm screen image containing the selected captured image. The alarm screen image is generated by using the imaging data D25 of the original image having been captured by the imaging unit 25 that has imaged the obstacle. The alarm screen image is a screen image in which only the original image is displayed, or the displays of a region through which the vehicle 20 passes, a message, a rectangular frame line surrounding an obstacle, and the like are superimposed on the original image. The alarm screen image generation unit 1042 outputs, to the display screen image switching unit 1043, the alarm screen image data including the original image, as alarm screen image data D1042, captured by the imaging unit 25 that images the obstacle.

The display screen image switching unit 1043 performs a process of switching the screen image to be displayed on the display unit 23 based on the recognition result of the space recognition unit 105. When it is determined by the collision determination unit 1052 of the space recognition unit 105 that no obstacle is present on the traveling route, the display screen image switching unit 1043 outputs surrounding screen image data D1041 to the display unit 23 to perform a process of displaying a surrounding screen image including a composite image such as a bird's-eye view image or a 3D image on the display unit 23. On the other hand, when it is determined that an obstacle is present on the traveling route, it outputs the alarm screen image data D1042 to the display unit 23 to perform a process of displaying, on the display unit 23, an alarm screen image including an original image in which an obstacle is imaged. Then, when the obstacle moves from the traveling route to the outside of the route, it cancels the display of the alarm screen image to perform a process of displaying the surrounding screen image.

The space recognition unit 105 includes the obstacle detection unit 1051 and the collision determination unit 1052. The imaging data D25 and the distance measurement data D26 are input to the obstacle detection unit 1051. The obstacle detection unit 1051 detects an obstacle by using at least one of the imaging data D25 and the distance measurement data D26. The obstacle detection unit 1051 may detect an obstacle by using both the imaging data D25 and the distance measurement data D26. The obstacle detection unit 1051 supplies the detected obstacle information D1051 to the collision determination unit 1052 and the alarm screen image generation unit 1042. The alarm screen image generation unit 1042 selects, as a captured image in which the obstacle is imaged, a captured image obtained by imaging a region where an obstacle is detected.

The collision determination unit 1052 determines, based on the travel plan data D103 and the obstacle information D1051, whether an obstacle is present within the region wherethrough which vehicle 20 passes, that is, on the traveling route.

The collision determination unit 1052 supplies the determination result as obstacle detection data D1052 to the display screen image switching unit 1043.

Figure 4:
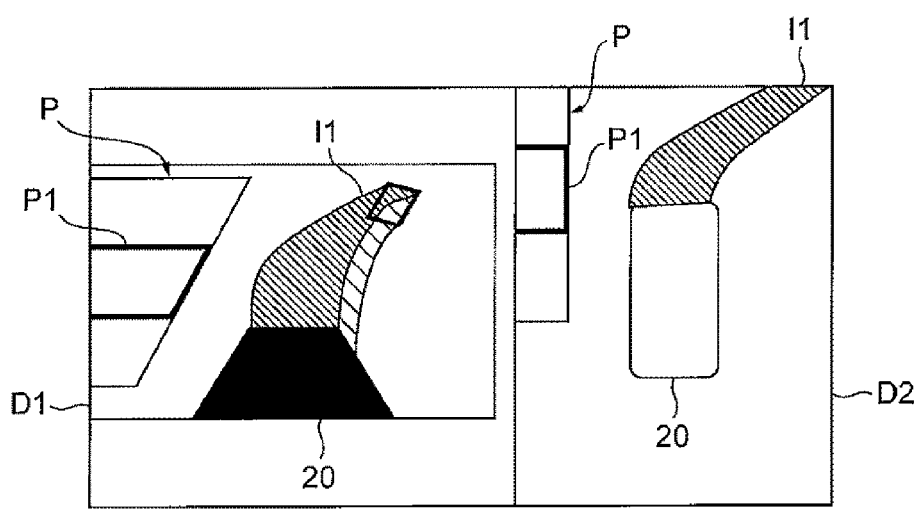
FIG. 4 is a diagram which shows an example of the composite screen image which is displayed on the display unit when no obstacle is present in the region through which a vehicle passes.

FIG. 4 is a diagram showing an example of a composite screen image displayed on the display unit when no obstacle is present in the region through which the vehicle passes, and is an example of a screen image displayed during automatic parking control. In FIG. 4, the line shown on the side of the vehicle 20 is a parking frame P, and the thick line indicates a target parking position P1.

In the example shown in FIG. 4, no obstacle is present in a traveling route I1. Therefore, the surrounding screen image including the composite screen image obtained by combining the screen images captured by the plurality of imaging units 25 is displayed on the display unit 23. In a 3D screen image D1 and a bird's-eye view screen image D2, which are surrounding screen images, the traveling route I1 is superimposed and displayed on the composite image by hatching. The driver can check the surroundings of the vehicle 20 by viewing these composite screen images. In the first example shown in FIG. 4, the 3D screen image D1 and the bird's-eye view screen image D2 as a surrounding screen image to make it easier to check the situation around the vehicle are displayed side by side on the display unit 23, but the present invention is not limited to this. Only one of the 3D screen image D1 and the bird's-eye view screen image D2 may be displayed.

Figure 5:
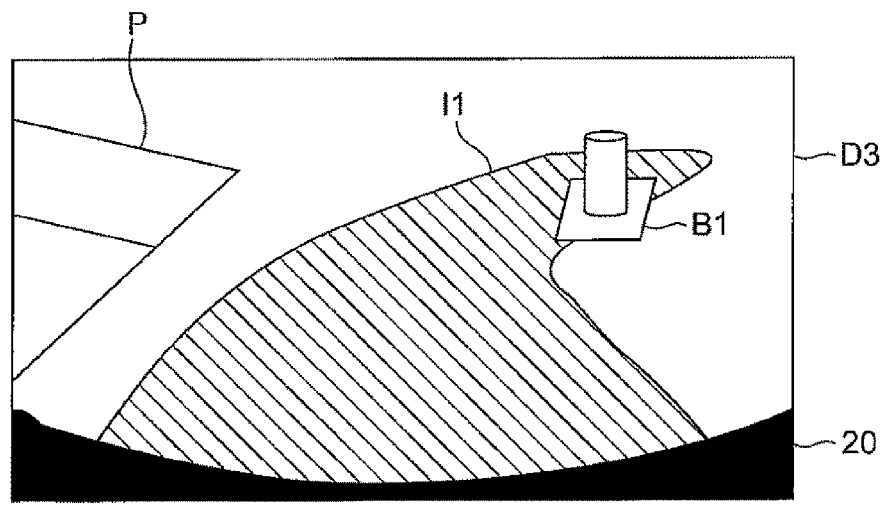
FIG. 5 is a diagram which shows a first example of an alarm screen image displayed by the vehicle control device of an embodiment.

FIG. 5 is a diagram showing a first example of an alarm screen image displayed by the vehicle control device of an embodiment. The alarm screen image D3 is a screen image including an original image displayed on the display unit 23 when an obstacle is detected in the traveling route I1. In the first example shown in FIG. 5, an obstacle B1 is present in the traveling route I1.

The alarm screen image generation unit 1042 selects, as a captured image in which the obstacle B1 is imaged, a captured image obtained by imaging a region where the obstacle B1 is detected to generate an alarm screen image D3 containing the selected captured image. Then, the display screen image switching unit 1043 performs a process of displaying the alarm screen image D3 on the display unit 23.

Therefore, the composite screen image as shown in FIG. 4 is not displayed on the display unit 23, and the alarm screen image D3 using the original image captured by the camera 25F that images the obstacle B1 is displayed. In the alarm screen image D3, the traveling route I1 is superimposed and displayed on the original image by hatching. The driver can accurately visually recognize the obstacle B1 by viewing the alarm screen image D3.

Figure 6:
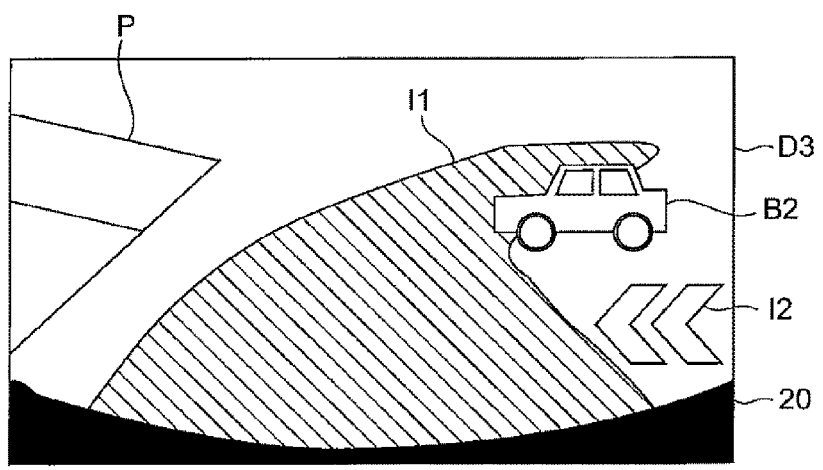
FIG. 6 is a diagram which shows a second example of the alarm screen image displayed by the vehicle control device of an embodiment.

FIG. 6 is a diagram showing a second example of the alarm screen image displayed by the vehicle control device of an embodiment. The display screen image switching unit 1043 may perform a process of displaying the moving direction of an obstacle B2 on the alarm screen image D3. In the second example shown in FIG. 6, when the moving obstacle B2 is detected in the traveling route I1, an arrow icon I2, as the alarm screen image D3, indicating the moving direction of the obstacle B2 is superimposed and displayed on the original image. The obstacle b2 shown in FIG. 6 is another vehicle that moves in front of the own vehicle from right to left. The driver can also confirm the movement of the obstacle B2 by viewing the arrow icon I2 in the moving direction shown in the alarm screen image D3.

Figure 7:
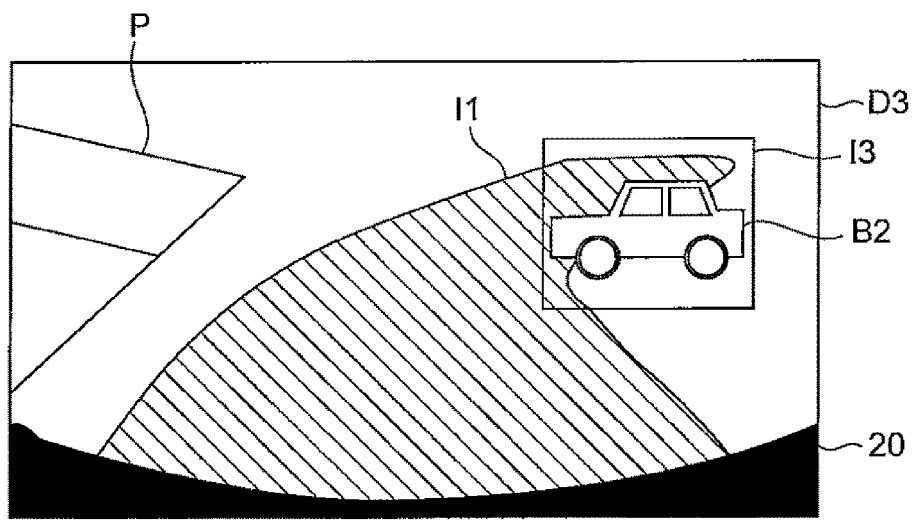
FIG. 7 is a diagram which shows a third example of the alarm screen image displayed by the vehicle control device of an embodiment.

FIG. 7 is a diagram showing a third example of the alarm screen image displayed by the vehicle control device of an embodiment. The display screen image switching unit 1043 may perform a process of displaying the rectangular frame line I3 surrounding the obstacle B2. In the third example shown in FIG. 7, when the obstacle B2 moving in the traveling route I1 is detected, a rectangular frame line I3 surrounding the detected obstacle is superimposed and displayed on the original image as an alarm screen image. The driver can easily confirm the presence of the obstacle B2 by the frame line I3 displayed on the alarm screen image D3.

Figure 8:
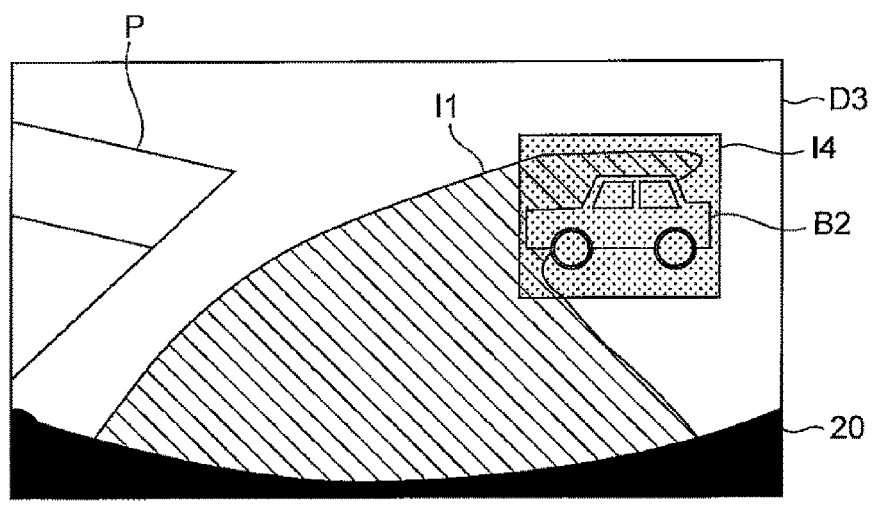
FIG. 8 is a diagram which shows a fourth example of the alarm screen image displayed by the vehicle control device of an embodiment.

FIG. 8 is a diagram showing a fourth example of an alarm screen image displayed by the vehicle control device of an embodiment.

The display screen image switching unit 1043 may perform a process of displaying a frame line I4 surrounding the obstacle B2 on the alarm screen image D3, and a process of switching a color in the region surrounded by the frame line I4 to a special color different from a color at a normal time to display the region with the switched color in the alarm screen image D3. In the fourth example shown in FIG. 8, when the obstacle B2 moving in the traveling route I1 is detected, the detected obstacle B2 is surrounded by the rectangular frame line I4, the color in the region surrounded by the frame line I4 is switched to a special color and they are superimposed and displayed on the original image as an alarm screen image. The driver can easily confirm the presence of the obstacle B2 by the change in color of the region surrounded by the frame line I4 displayed on the alarm screen image D3.

Figure 9:
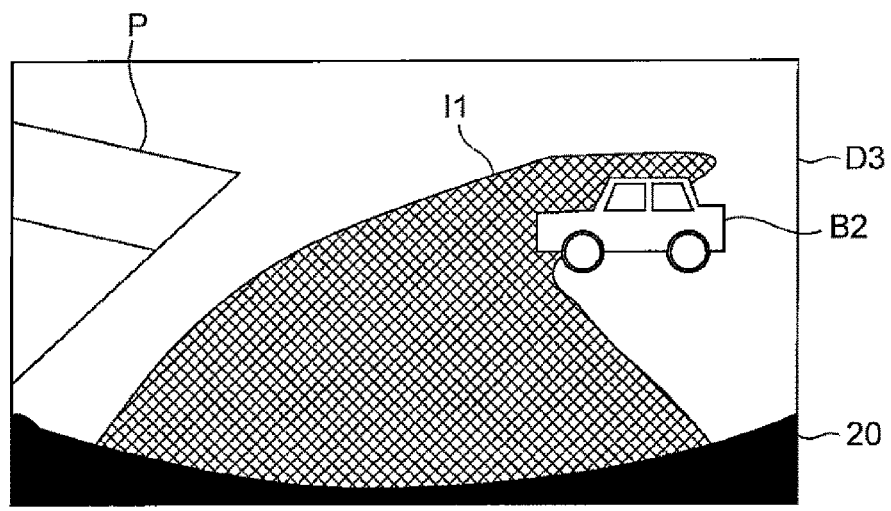
FIG. 9 is a diagram which shows a fifth example of the alarm screen image displayed by the vehicle control device of an embodiment.

FIG. 9 is a diagram showing a fifth example of an alarm screen image displayed by the vehicle control device of an embodiment. When the display screen image switching unit 1043 detects an obstacle B2 on the traveling route, the display screen image switching unit 1043 may perform a process of switching the color of the traveling route I1 to display it on the alarm screen image D3. In the fifth example shown in FIG. 9, when the obstacle B2 moving in the traveling route I1 is detected, the color of the traveling route I1 is switched from a color at a normal time to another color, and superimposed and displayed on the original image as an alarm screen image. The driver can easily confirm the presence of the obstacle B2 by the change in color of the traveling route I1 displayed on the alarm screen image D3.

Next, a screen image display method by the vehicle control device of the present embodiment will be described.

Figure 10:
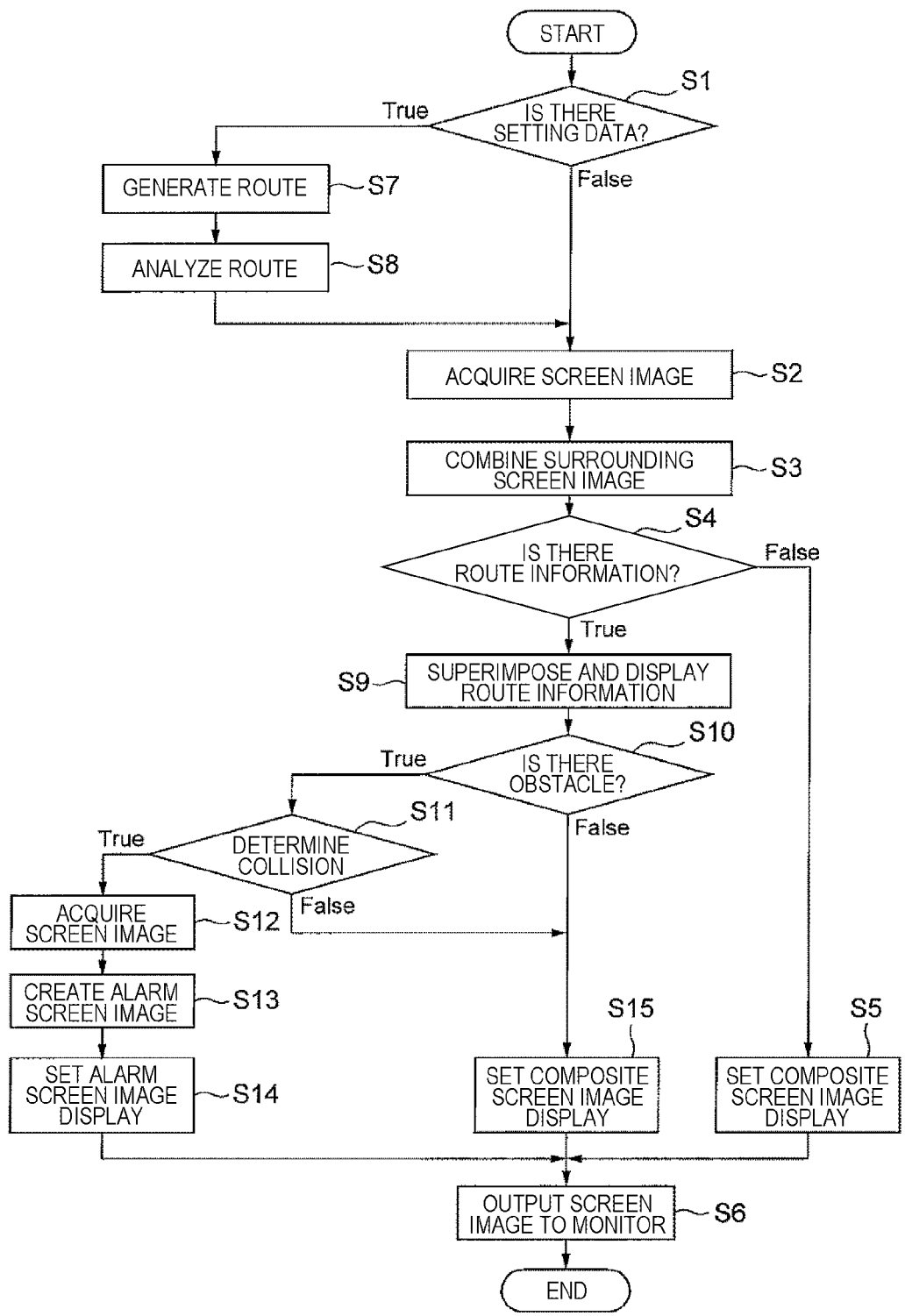
FIG. 10 is a flowchart for explaining the content of control in the vehicle control device of an embodiment.

FIG. 10 is a flowchart for explaining the content of control in the vehicle control device of an embodiment.

First, the state management unit 101 determines the presence/absence of the setting data D24 input from the operation unit 24 (step S1). Here, when there is no setting data D24 (False), the control image generation unit 104 acquires the imaging data D25 provided by each of the plurality of imaging units 25 (step S2). Then, the surrounding screen image composition unit 1041 combines respective pieces of imaging data D25 to generate the surrounding screen image data D1041 of the surrounding screen image including the composite image (step S3).

When the surrounding screen image data D1041 is generated by the surrounding screen image composition unit 1041, the control image generation unit 104, determines whether the travel plan data D103 provided by the route analysis unit 103 is present (step S4). Here, when there is no travel plan data D103, it is determined that there is no route information (False), and the display screen image switching unit 1043 sets the composite screen image display (step S5). Then, the surrounding screen image data D1041 generated in step S3 is output to the display unit 23 which is a monitor, and the surrounding screen image including the composite image is displayed on the display unit 23 (step S6). After that, the process is repeated from step S.

On the other hand, when it is determined in step S1 that there is setting data D24 (True), the state management unit 101 inputs the route generation request data D101 including the destination information to the route generation unit 102. The route generation unit 102 calculates the route from the current position to the destination based on the input route generation request data D101 to generate route data D102 (step S7).

The route data D102 generated by the route generation unit 102 is input to the route analysis unit 103, and the route analysis unit 103 performs the route analysis (step S8). The route analysis unit 103 calculates the travel plan data D103 based on the input route data D102. After the screen image acquisition (step S2) and the surrounding screen image composition (step S3) are executed, it is determined in step S4 that there is the travel plan data D103 (True), and the process proceeds to the next step S9 and later.

Based on the travel plan data D103 provided by the route analysis unit 103, the control image generation unit 104 performs combination so that the route line, on which a vehicle is to travel, drawn from the target steering amount included in the travel target point data provided at predetermined intervals is superimposed and displayed on the vehicle surrounding screen image data D1041 generated in step S3 (step S9).

Next, the obstacle detection unit 1051 detects, based on at least one of the distance measurement data D26 input from the distance measuring sensor 26 and the imaging data D25 input from the imaging unit 25, the obstacle to input the result as obstacle data D1051 to the collision determination unit 1052 and the alarm screen image generation unit 1042 (step S10). The alarm screen image generation unit 1042 identifies, from the obstacle data D1051, the camera 25 that images the obstacle, and identifies the imaging data D25 of the captured image captured by the camera 25. Then, the alarm screen image generation unit 1042 generates the alarm screen image data D1042 from the imaging data D25 based on the obstacle data D1051.

Then, when the obstacle is detected in step S10 (True), the collision determination is executed (step S11). The collision determination unit 1052 predicts the possibility of the own vehicle colliding with an obstacle from the obstacle data D1051 and the travel plan data D103. Here, it is determined whether the detected obstacle is present on the traveling route, and the determination result as the obstacle detection data D1052 is supplied to the display screen image switching unit 1043.

When it is predicted that there is a possibility of collision in step S1*l* (True), the alarm screen image data D1042 is acquired from the alarm screen image generation unit 1042 (step S12).

When the display screen image switching unit 1043 acquires the alarm screen image data D1042, it creates an alarm screen image (step S13) and performs a process of setting the alarm screen image display (step S14). When the display screen image switching unit 1043 determines in the collision determination in step S11 that the situation has changed from a situation in which a vehicle does not collide with an obstacle to a situation in which it collides with the obstacle, it may display the alarm screen image data D1042 on the display unit 23, and, at the same time, may perform a process in which a notification sound for notifying the occupant of the detection of an obstacle a collision with which is predicted is whistled once. Further, in order to notify the occupant that an obstacle continues to be present on the traveling route, the notification sound may be repeatedly whistled while the alarm screen image data D1042 is set.

Here, the notification sound that is repeatedly whistled may be changed in the whistling interval according to the distance to the obstacle included in the obstacle data D1051. For example, when the distance to the obstacle is long, the whistling interval is lengthened, and when the distance to the obstacle is short, the whistling interval is shortened, so that the occupant will be able to determine the distance to the obstacle. Then, the volume of the notification sound that is repeatedly whistled may be changed according to the distance to the obstacle included in the obstacle data D1051. For example, when the distance to the obstacle is long, the volume is decreased, and when the distance to the obstacle is short, the volume is increased, so that the occupant will be able to determine the distance to the obstacle. Further, the frequency of the notification sound that is repeatedly whistled may be changed according to the distance to the obstacle included in the obstacle data D1051. For example, when the distance to the obstacle is long, the notification sound has a low frequency and when the distance to the obstacle is short, the notification sound has a high frequency, so that the occupant will be able to determine the distance to the obstacle.

When no obstacle is detected in step S10 (False), the display of the composite screen image is set (step S15). The display screen image switching unit 1043 of the control image generation unit 104 outputs vehicle surrounding screen image data D104 including the composite image to the display unit 23 (step S6).

Figure 11:
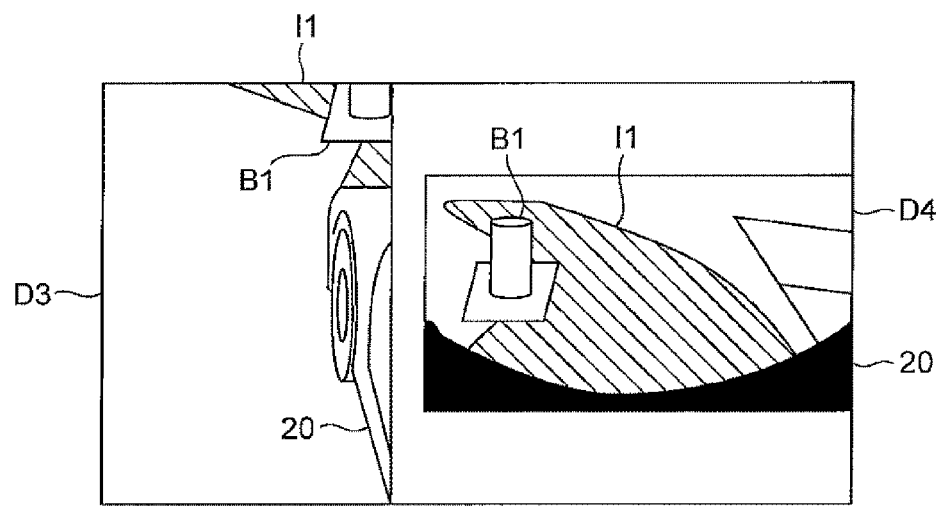
FIG. 11 is a diagram which shows a sixth example of an alarm screen displayed by the vehicle control device of an embodiment.

FIG. 11 shows a sixth example of an alarm screen image which is an original image displayed when an obstacle is detected in the traveling route during automatic parking control.

When the alarm screen image generation unit 1042 detects the identical obstacle B1 by a plurality of sensors such as the camera 25L, the camera 25F, and the distance measuring sensor 26, the alarm screen image generation unit 1042 selects, as the captured images in which the obstacle B1 is imaged, the captured images by the camera 25L and the camera 25F which image the regions detected by the plurality of sensors to generate the alarm screen images D3 and D4 including the selected captured images.

In the sixth example shown in FIG. 11, the two alarm screen images D3 and D4 are displayed side by side on the display unit 23. The alarm screen images D3 and D4 are screen images including the original image captured by the camera 25L and the camera 25F, respectively. The driver can accurately visually recognize the obstacle B1 by viewing the alarm screen images D3 and D4.

When the alarm screen image generation unit 1042 detects the identical obstacle by a plurality of sensors such as the camera 25L, the camera 25F, or the distance measuring sensor 26, the captured image obtained by imaging a region detected by the sensor having a highest detection accuracy among the plurality of sensors may be selected as the captured image in which the obstacle is imaged. For example, when an obstacle is detected by both the distance measuring sensor 26 and the imaging unit 25, the distance measurement data D26 has higher detection accuracy than the imaging data D25, so that the captured image captured by the camera that images the detection region of the distance measurement data D26 may be displayed as an alarm screen image.

Figure 12:
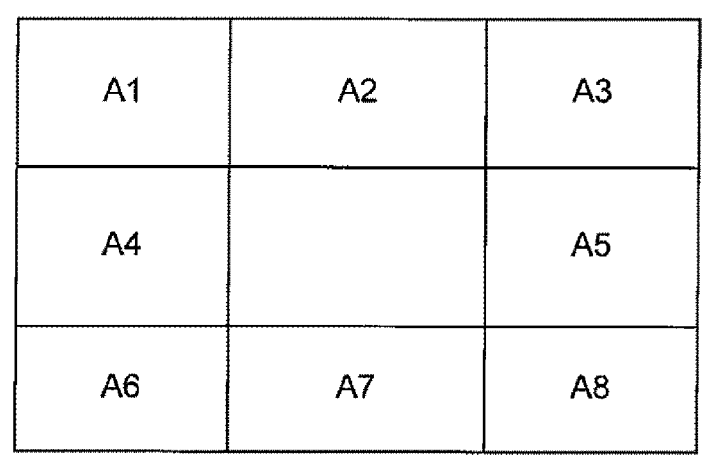

FIG. 12 shows the state in which the region adjacent to a vehicle as the center is divided into a grid pattern based on the region which is imaged by cameras attached to the vehicle. Each grid region is configured as follows.

A region A2 in front of the vehicle is a region imaged only by the camera 25F that images the front side, and a region A7 behind the vehicle is a region that is imaged only by the camera 25B that images the rear side. A region A4 toward the left of the vehicle is a region that is imaged only by the camera 25L that images the left side, and a region A5 toward the right of the vehicle is a region imaged only by the camera 25R that images the right side. A region A1 toward the left of and in front of the vehicle is a region imaged by both the camera 25F that images the front side and the camera 25L that images the left side, a region A3 toward the right of and in front of the vehicle is a region imaged by both the camera 25F that images the front and the camera 25R that images the right side. In addition, a region A6 toward the left of and behind the vehicle is a region that is imaged by both the camera 25B that images the rear side and the camera 25L that images the left side, and a region A8 toward the right of and behind the vehicle is a region that is imaged by both the camera 25B that images the rear side and the camera 25R that images the right side.

The camera screen image displayed on the display unit 23 is selected by the grid region where the obstacle detected by the obstacle detection unit 1051 is located. For example, when the obstacle is present in the region A1, the display screen image switching unit 1043 displays, as an alarm screen image, the camera screen images by the camera 25F that images the front side and the camera 25L that images the left side. Then, for example, when the obstacle is present in the region A2, the display screen image switching unit 1043 displays, as an alarm screen image, the camera screen image by the camera 25F that images the front side.

According to the vehicle control device 10 described above, when no obstacle is present on the traveling route of vehicle 20, the surrounding screen images D1 and D2 including a composite image obtained by combining the captured images captured by the plurality of imaging units 25 are displayed on the display unit 23. Then, when an obstacle is present on the traveling route of the vehicle 20, the alarm screen images D3 and D4 including the original image captured by the imaging unit 25 that images the obstacle are displayed on the display unit 23. Therefore, when the driver views the alarm screen images D3 and D4 in a case where the obstacle is present on the traveling route of the vehicle 20, the driver can visually recognize accurately the obstacles B1 and B2 to confirm the existence of the obstacles.

The embodiments of the present invention have been described in detail above. The present invention is not limited to the above-described embodiments, and various design changes can be made without departing from the spirit of the present invention described in the claims. For example, the above-described embodiments are described in detail in order to explain the present invention in an easy-to-understand manner, and are not necessarily limited to the one including all the described configurations. Further, it is possible to replace part of the configuration of an embodiment with the configuration of another embodiment, and it is also possible to add the configuration of another embodiment to the configuration of an embodiment. Further, for part of the configuration of each embodiment, it is possible to add/delete/replace with another configuration.

REFERENCE SIGNS LIST 10 vehicle control device
20 vehicle
23 display unit
24 operation unit
25 imaging unit
25F, 25B, 25L, 25R camera
26 distance measuring sensor
101 state management unit
102 route generation unit
103 route analysis unit
104 control image generation unit
1041 surrounding screen image composition unit
1042 alarm screen image generation unit 1043 display screen image switching unit
105 space recognition unit
1051 obstacle detection unit
1052 collision determination unit
B1, B2 obstacle
D1, D2 surrounding screen image
D3, D4 alarm screen image
I1 traveling route

The invention claimed is:

1. A vehicle control device comprising:
a plurality of imaging units configured to image an outside world of a vehicle;
a surrounding screen image composition unit configured to combine a plurality of captured images captured by the plurality of imaging units to generate a surrounding screen image;
a collision determination unit configured to determine whether an obstacle is present on a traveling route of the vehicle;
an alarm screen image generation unit configured to select, from a plurality of captured images captured by the plurality of imaging units, a captured image in which the obstacle is imaged to generate an alarm screen image including the selected captured image; and
a display screen image switching unit configured to perform a process of displaying the surrounding screen image when the collision determination unit determines that the obstacle is not present, and display the alarm screen image when the collision determination unit determines that the obstacle is present,
wherein the display screen image switching unit is configured to, when the obstacle is detected on the traveling route, perform a process of whistling a notification sound,
wherein the display screen image switching unit is configured to change a whistling interval of the notification sound according to a distance to the obstacle, such that the whistling interval increases as the distance to the obstacle increases,
wherein the display screen image switching unit is configured to change a whistling volume of the notification sound according to a distance to the obstacle, such that the whistling volume decreases as the distance to the obstacle decreases, and
wherein the display screen image switching unit is configured to change a frequency of the notification sound according to a distance to the obstacle such that the frequency decreases as the distance to the obstacle increases.

2. The vehicle control device according to claim 1, wherein the alarm screen image generation unit is configured to select, as a captured image in which the obstacle is imaged, a captured image obtained by imaging a region where the obstacle is detected.

3. The vehicle control device according to claim 2, wherein when an identical obstacle is detected by a plurality of sensors, the alarm screen image generation unit is configured to select, as a captured image in which the obstacle is imaged, a captured image obtained by imaging a region detected by a sensor having a highest detection accuracy among the plurality of sensors.

4. The vehicle control device according to claim 2, wherein when an identical obstacle is detected by a plurality of sensors, the alarm screen image generation unit is configured to select, as captured images in which the obstacle is captured, a plurality of captured images obtained by imaging respective regions detected by the plurality of sensors.

5. The vehicle control device according to claim 1, wherein when the obstacle moves from the traveling route to an outside of the traveling route, the display screen image switching unit is configured to perform a process of cancelling a display of the alarm screen image to display the surrounding screen image.

6. The vehicle control device according to claim 1, wherein the display screen image switching unit is configured to perform a process of displaying a moving direction of the obstacle in the alarm screen image.

7. The vehicle control device according to claim 1, wherein the display screen image switching unit is configured to perform a process of displaying a frame line surrounding the obstacle in the alarm screen image.

8. The vehicle control device according to claim 7, wherein the display screen image switching unit is configured to perform a process of switching a color in a region surrounded by the frame line to a special color different from a color at a normal time to display the region with the switched color in the alarm screen image.

9. The vehicle control device according to claim 1, wherein when the obstacle is detected on the traveling route, the display screen image switching unit is configured to perform a process of switching a color of a region where the vehicle travels to display the region with the switched color in the alarm screen image.

* * * * *